United States Patent [19]
Hildebrand

[11] 3,759,616
[45] Sept. 18, 1973

[54] ELECTRO-OPTICAL DISTANCE MEASURING INSTRUMENT

[75] Inventor: Klaus Hildebrand, Heerbrugg, Switzerland

[73] Assignee: Wild Heerbrugg Aktiengesellschaft, Heerbrugg, Switzerland

[22] Filed: July 14, 1971

[21] Appl. No.: 162,355

Related U.S. Application Data

[63] Continuation-in-part of Ser. No. 827,791, May 26, 1969, abandoned.

[30] Foreign Application Priority Data
May 28, 1968 Switzerland.......................... 7870/68
Oct. 15, 1968 Switzerland........................ 15412/68

[52] U.S. Cl...................... 356/5, 356/4, 250/217.55
[51] Int. Cl............................................... G01c 3/08
[58] Field of Search ...................... 356/4, 5; 350/45; 353/102; 250/199; 331/94.5 H

[56] References Cited
UNITED STATES PATENTS

| | | | |
|---|---|---|---|
| 3,428,815 | 2/1969 | Thompson | 356/5 |
| 3,359,507 | 12/1967 | Hall | 331/94.5 H |
| 3,544,796 | 12/1970 | Baker | 356/152 |
| 3,619,058 | 11/1971 | Hewlett et al. | 356/5 |
| 3,600,568 | 8/1971 | Weyrauch | 353/102 |

OTHER PUBLICATIONS
Chen et al., Applied Optics, Vol. 2, No. 3, 3–1963, pp. 265–271.

Primary Examiner—Benjamin A. Borchelt
Assistant Examiner—Stephen C. Buczinski
Attorney—Werner W. Kleeman

[57] ABSTRACT

An electro-optical distance measuring instrument embodying a non-coherent light emitting diode, the light beam of which is directly amplitude-modulated by an oscillator and delivered to a receiver through the agency of means for mixing the modulation phases, a transmitting objective, and a reflector arranged at the remote end of the measuring path. The aforementioned means for mixing the modulation phases is arranged with respect to the transmitting objective such that the transmitting objective is fully illuminated and the transmitting objective produces an image of the aforementioned means at an infinite distance.

7 Claims, 3 Drawing Figures

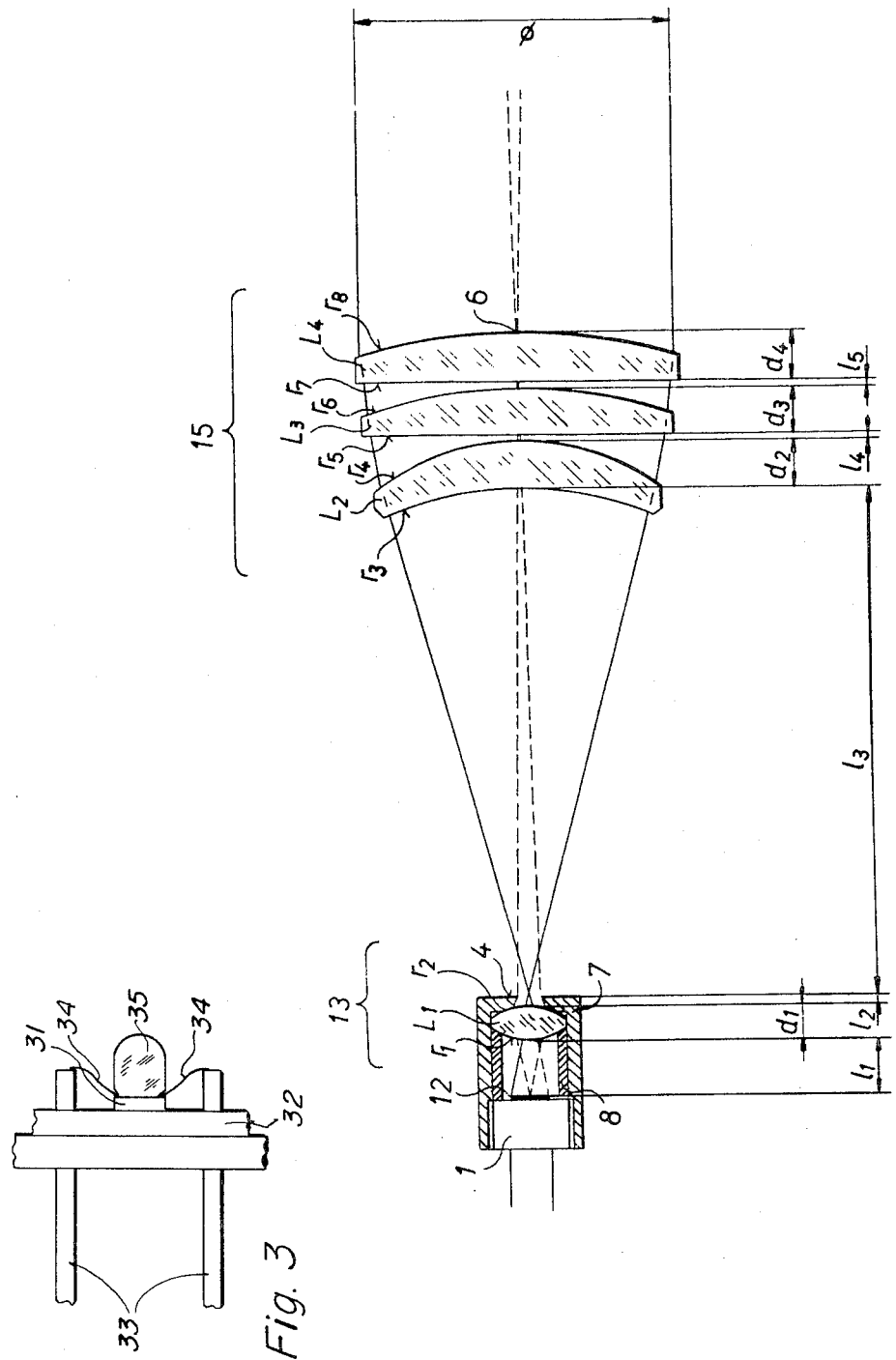

ELECTRO-OPTICAL DISTANCE MEASURING INSTRUMENT

CROSS-REFERENCE TO RELATED APPLICATION

The present application is a continuation-in-part application of my commonly assigned, copending U.S. application, Ser. No. 827,791, filed May 26, 1969, and entitled "ELECTRO-OPTICAL DISTANCE MEASURING DEVICE" and now abandoned.

BACKGROUND OF THE INVENTION

The present invention relates to a new and improved electro-optical distance measuring instrument or device which is of the type where its light source is a non-coherent light emitting diode, also sometimes referred to in the art as a luminescent diode.

Usually an electro-optical distance measuring instrument embodies a measuring system and an electronic system. The transmitter together with the non-coherent light emitting diode and the transmitting objective as well as the receiver with the receiving objective are accommodated at the measuring system or portion of the equipment. The transmitting objective and the receiving objective are aligned with respect to a reflector located at the remote or opposite end of the path or distance to be measured.

In prior art electro-optical distance measuring devices there is either utilized as the radiation source a laser system having coherent radiation or a non-coherent light emitting diode having incoherent light emission or radiation. In the case of a laser system the expenditure of equipment is quite extensive since the radiation emanates quasi from a point light source at an infinite distance and then can be only utilized for distance measuring operations if it is enlarged by means of a telescope. This telescope may be either of the Galilei or Keppler type.

More recently, one has departed from the use of laser systems and gone over to the use of distance measuring devices equipped with a non-coherent light emitting diode. This non-coherent light emitting diode, which for instance may be a gallium-arsenide-diode, constitutes an areal or surface-shaped light source and does not provide any point-shape light source similar to a laser. The bundle of light rays or beam of such non-coherent light emitting diode is directly amplitude modulated by an oscillator. As a result, there is afforded much greater accuracy of the distance measuring operation than with the use of a laser system. However, it was not before long that the drawback was recognised that with the direct modulation of non-coherent light emitting diodes the modulation phase possessed a certain dependency upon the location of the emission at the radiating or light emitting surface of the diode. This dependency is based upon the transit time effects perceivable at the surface of the diode. In other words: at the illumination surface of the diode the individual localities are excited into a state of emission at different times. This uncontrolled transit time effect influences the modulation phases in such manner that false measurement results are indicated at the electronic system of the distance measuring instrument. Up to now it has not been possible to construct a non-coherent light emitting diode which does not exhibit these transit time effects. The transit time effects are different from diode to diode, even if the diodes themselves are produced in accordance with the same manufacturing techniques. This in effect means that electro-optical distance measuring devices equipped with such non-coherent light emitting diodes are not capable of producing accurate measurement results.

SUMMARY OF THE INVENTION

Accordingly, it is a primary object of this invention to provide a new and improved electro-optical distance measuring instrument which eliminates the aforementioned drawbacks associated with the known constructions employing such non-coherent light emitting diodes.

Another and more specific objective of this invention is to effectively eliminate the uncontrolled phenomena brought about by the previously mentioned transit time effects at electro-optical distance measuring devices.

A primary objective of the present invention is to be able to employ, in accordance with the teachings of the present invention, non-coherent light emitting diodes of different origin without falsifying the measurement results. By virtue of the teachings of this invention it is no longer necessary to manufacture diodes with extremely small manufacturing tolerances for use in electro-optical distance measuring devices. This in effect means that the diodes themselves can be considerably simplified, rendered less expensive to manufacture, and the accuracy of the electro-optical distance measuring device is increased.

A further aspect of the present invention resides in the fact that the measurement result, indicated by the electronic system or portion of the distance measuring instrument or device, is no longer dependent upon the alignment of the transmitting- and receiving objectives of the measuring system with respect to the reflector erected at the remote end of the distance to be measured. If one is familiar with the practical difficulties of accurately aligning the transmitting- and receiving objectives with respect to the reflector then one will be well aware of the fact that during the performance of the measurement operation this alignment can change, and hence the last- mentioned aspect of this invention attains great practical significance.

Now, in order to implement these and still further objects of the invention which will become more readily apparent as the description proceeds, it will be understood that this invention is directed to a novel electro-optical distance measuring instrument incorporating a non-coherent light emitting diode, the bundle of light rays or beam of which is directly amplitude modulated by an oscillator, and the amplitude-modulated beam is conducted through the agency of means for mixing the modulation phases, a transmitting objective, a reflector arranged at the remote end of the path to be measured, and via a receiving objective, to a receiver. The means for mixing the modulation phases is arranged with respect to the transmitting objective in such a manner that the transmitting objective is fully illuminated and the transmitting objective produces an image of the aforementioned means at an infinite distance.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2 is an enlarged view of a portion of the transmitter used in the distance measuring instrument of FIG. 1; and FIG. 3 is a sectional view of the non-coherent light emitting diode and the phase mixing lense used in the transmitter portion of the distance measuring instrument of FIG. 1.

DETAILED DESCRIPTION OF THE PREFERRED EMBODIMENTS

Figure 1:
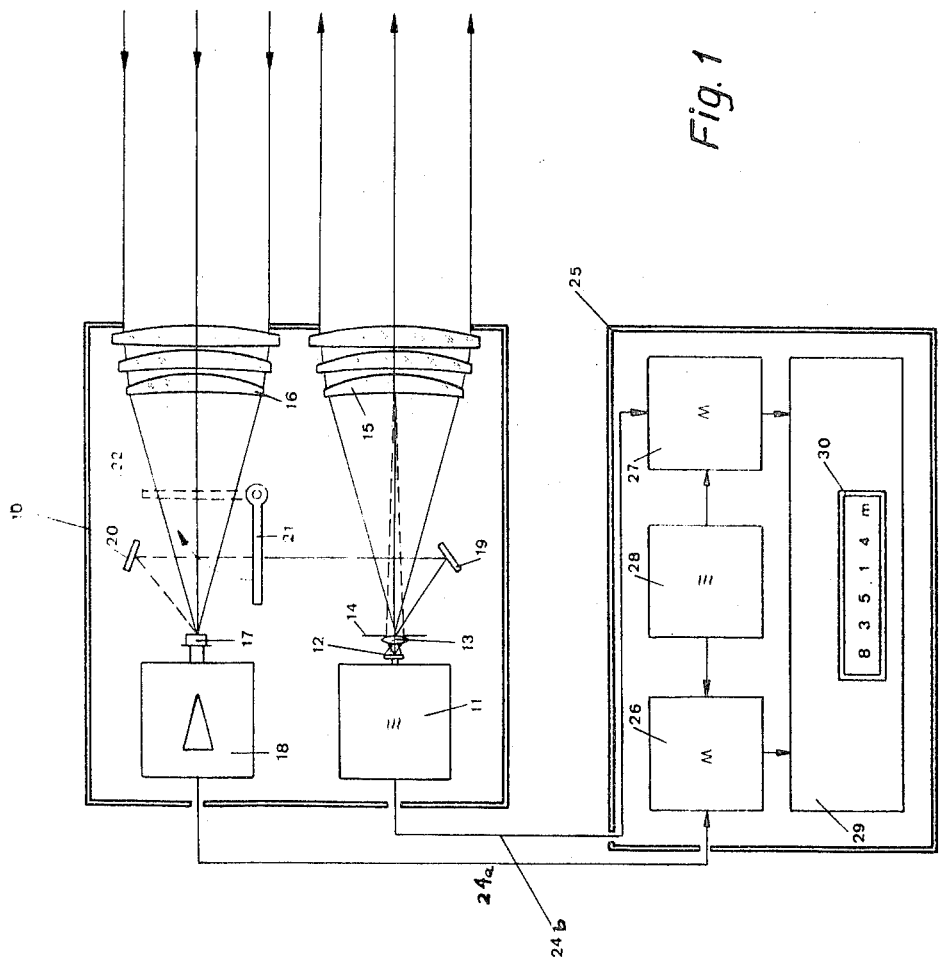
FIG. 1 is a schematic illustration of a preferred embodiment of electro-optical distance measuring instrument or device designed according to the teachings of the present invention.

Describing now the drawings and referring to FIG. 1 initially, it will be seen that the electro-optical distance measuring instrument or device disclosed therein, by way of example, consists of a measuring portion or system 10 and the electronic circuit portion or system 25. At the measuring system 10 there are arranged the transmitter and receiver. The transmitter consists of an oscillator 11 which controls the non-coherent light emitting diode 12. As already explained this diode 12 is a gallium-arsenide-diode having a light emitting surface or light radiating surface. The gallium-arsenide-diode 12 delivers invisible radiation, in the near infrared range between 0.7 to 0.94 $\mu$m. The diode 12 emits approximately 1.2 mW incoherent radiation of 0.875 $\mu$m wave length. This incoherent radiation is used as the carrier wave. This radiation is condensed or focussed into a beam width of 15' by means of the three-lense transmitter or transmitting objective, specially corrected for this wave length, and possessing a diameter of about 70 millimeters and a focal length of 80 millimeters. By means of the phase mixing lense 13 the transmitting objective 15 is completely illuminated. The transmitting objective 15 produces, at infinity, an image of the phase mixing lense 13. The bundle of light rays or beam from the transmitting objective 15 travels through the path to be measured and arrives at the reflector 23, which can consist of one or a number of triple mirror reflectors. Such triple mirror reflector may be of the type disclosed in my commonly assigned, co-pending U.S. application, Ser. No. 133,093, filed Apr. 12, 1971, and entitled "Triple Mirror Reflector." At this reflector the arriving bundle of light rays is parallelly oriented and transmitted to the receiver or receiving objective 16. The receiver objective 16 is essentially similarly constructed as the transmitting objective 15. The receiving objective 16 focuses the bundle of light rays upon the actual receiver 17 which can be a silicon photodiode. The received signal is amplified at the receiver amplifier 18 and transmitted through the agency of the conductor 24a to the electronic circuit 25.

At the measuring system 10 a diaphragm or light stop 14 is arranged at the phase mixing lense 13, this diaphragm being phase uniformly illuminated and displayed at an infinite distance from the transmitting objective 15. Thus, it is of no importance whether the image of the diaphragm 14 or the phase mixing lense 13 is produced at an infinite distance by the transmitting objective 15.

Furthermore, at the measuring system 10 there is provided a calibration line which consists of both mirrors 19 and 20 and the switch 21. When the switch 21 is located in the full line position then the internal calibration line is switched-out. When the switch 21 is located in the phantom line position, indicated at reference character 22, then the bundle of light rays, which arrives from the reflector 23 at the receiver objective 16, is blocked so that calibration of the measuring system 10 can be carried out. This calibration is required prior to each measuring sequence for adjusting the so-called starting value and for the so-called "null-calibration." It is not believed necessary to make further reference to the calibration line as such since it does not constitute part of the subject matter of this invention.

The electronic system or portion 25 of the electro-optical distance measuring instrument or device will now be described in greater detail in conjunction with the entire mode of operation. The oscillator 11 at the measuring system 10 directly controls the non-coherent light emitting diode 12. The incoherent carrier wave of, for instance, a wave length of 0.875 $\mu$m is directly amplitude modulated by the oscillator 11. The selected modulation frequency amounts to 14.98540 MHz and, with a refractive index of the atmosphere of 1.000282, corresponds to a wave length of 20 meters or a measuring unit of 10 meters since the beam passes twice over the distance measured or measuring path. To find the multiple and the fractions of the instrument's measuring unit, namely the 10 meters-measuring unit, contained in the distance to be measured, determined by the phase measurement at 15 MHz, the modulation frequency is slowly swept up from a value which, for instance, is lower by 10 percent, namely 13.48686 MHz, to the previously mentioned value of 14.98540 MHz. This "sweeping up" or change of the modulation frequency by 10 percent takes place in approximately 10 seconds and is automatically controlled by the oscillator 11. The change of the modulation frequency by 10 percent likewise causes a change of the phase displacement or phase shift prevailing at the path to be measured by 10 percent. The continuous measurement of this phase displacement occurs, as will be more fully described hereinafter, at the electronic circuit system 25. It is still here to be mentioned that a distance to be measured of 100 meters length produces a phase shift or displacement of 2 $\pi$. The phase comparator 29 at the electronic circuit component 25 is constructed such that during sweeping up it can integrate the modulation frequency up to 10 times $2\pi$, which corresponds to a distance of 1,000 meters. In this way the multiple and partial measurement is possible in a continuous measuring operation. At the phase comparator or phase detector 29 there is located the digital read-out device 30 which provides a read-out with an accuracy of 1 millimeter to 1 centimeter. In FIG. 1 the indication or read-out has only been illustrated to exactly 1 centimeter.

Since during the measuring operation the modulation frequency is swept up and the phase at the distance to be measured continuously shifts, the previously mentioned transit time effects become disturbingly noticeable at the light emitting surface of the non-coherent light emitting diode 12. Under the expression transit time effects there is to be understood that the excitation current from the oscillator 11 arrives at the light emission surface of the diode at different and undefined periods of time of the individual emission locations so that the entire surface is never simultaneously illuminated in the mathematically strict sense. Consequently, the read-out device 30 does not indicate any exact measurement result. Owing to the arrangement of the phase mixing lense 13 at the direct region of the light emitting surface of the non-coherent light emitting diode 12 these uncontrollable phenomenon of the transit time effects are eliminated. The phase mixing lense 13 possesses approximately the same spatial dimensions as the illuminating or radiating surface of the diode 12.

The oscillator 11 not only delivers the modulation frequency directly to the non-coherent light emitting diode 12 rather also via the conductor 24b to the mixing stage or mixer 27 at the electronic circuit 25. Consequently the mixer 27 receives this modulation frequency as a reference frequency. The receiver amplifier 18 delivers in an amplified condition the modulation frequency received from the photodiode 17 via the conductor 24a to the other mixer 26 at the electronic circuit 25. An auxiliary oscillator 28 generates a smaller frequency than the modulation frequency for both mixers 26 and 27. The very high modulation frequency, which is in the MHz-range, is transposed at such mixers to a considerably smaller frequency. Owing to this transformation to the smaller modulation frequency the noise is eliminated so that no measurement results can occur. The low frequency outputs of both mixing stages 26 and 27 are connected with suitable inputs of the phase comparator 29 in which the phase shift between the reference frequency from the oscillator 11, the mixer 27 and the received frequency from the received amplifier 18 and the mixer 29 are compared. A digital evaluation device which has not been further described herein controls the digital read-out device 30. This digital evaluation device is well known in this particular art and therefore, since it does not as such constitute subject matter of this invention, has not been further described herein.

FIG. 2 illustrates constructional details of the arrangement of the non-coherent light emitting diode, the phase mixing lense and the transmitter objective of the measuring system 10 of the arrangement of FIG. 1. In FIG. 2 there has not been illustrated the oscillator which directly controls the non-coherent light emitting diode 12. The light emitting surface 2 of the diode 12 is reproduced by the phase mixing lense 13 at the inlet pupil of the transmitting objective 15 which produces an image of the light emitting diode surface 2 at the outlet pupil 6 of such transmitting objective 15, this outlet pupil coinciding, in the direction of light beam emission, with the last lense surface of said transmitter or transmitting objective. The outlet pupil of the phase mixing lense 13 is identical with the aperture or diaphragm 14 which is reproduced at infinity by the transmitting objective by utilizing its entire opening in the direction of the reflector, not here shown. Through this arrangement the diaphragm opening or aperture 14 is filled by rays of uniform modulation phase so that the phase of the bundle of rays or beam reflected back to the receiving objective by the remotely positioned reflector is not dependent upon the position of the reflector relative to this beam or bundle or rays. The diode 12 and the phase mixing lense 13 are accommodated in the housing 7. The end of the housing 7 is constructed so as to define the aperture 4 located at the outlet location of the rays or beam. The correct setting of the phase mixing lense 3 is ensured by the spacer member 8.

The phase mixing lense 13 consists of a lense $L_1$. This lense has the following dimensions and characteristics:

Radius $r_1 = +0.52$ mm.

Radius $r_2 = -0.52$ mm.

Lense Thickness $d_1 = 0.31$ mm.

Diameter = 0.6 mm.

The index of refraction of lense $L_1$ is $n = 1.6804$ for the emission wave length of the non-coherent light emitting diode used in connection with the described optical arrangement, which has a value $\lambda = 8750A$.

The distance $l_1$ between the light emitting surface 2 and the first surface apex of lense $L_1$ is 0.33 mm. This small lense $L_1$ forms a spot of $0.38\phi$ ($\phi$ being the diameter) of the light emitting surface 2 at a distance of 77 mm. which corresponds approximately to the focal length F of the transmitting objective 15, magnified approximately 180 times at the transmitting objective, so that the latter's outlet pupil 6 which has a diameter of about 70mm. is fully optically illuminated.

In the embodiment of the phase mixing lense-transmitting objective illustrated, the characters $L_1$ to $L_4$ denote the individual lenses, $r_1$ to $r_8$ the radii, $l_1$ to $l_5$ the air space or air gap between the lenses, $d_1$ to $d_4$ denote the thickness of the individual lenses. The symbol $n$ denotes the index of refraction for the wave length $\lambda = 8750A$.

Thus the illustrated system has the following characteristics and dimensions:

| | | | $n$ |
|---|---|---|---|
| Lense $L_1$ | $r_1 = +0.52$ | $l_1 = 0.33$ | |
| | $r_2 = -0.52$ | $d_1 = 0.31$ | 1.6804 |
| | | $l_2 = 0.05$ | |
| | | $l_3 = 60.0$ | |
| Lense $L_2$ | $r_3 = -68.5$ | $d_2 = 10.0$ | 1.598 |
| | $r_4 = -47.0$ | | |
| | | $l_4 = 0.2$ | |
| Lense $L_3$ | $r_5 = -203.0$ | $d_3 = 8.5$ | 1.598 |
| | $r_6 = -86.0$ | | |
| | | $l_5 = 0.2$ | |
| Lense $L_4$ | $r_7 = -730.0$ | $d_4 = 8.0$ | 1.598 |
| | $r_8 = -120.0$ | | |

$\phi = 70$ $L_2, L_3, L_4$ : Focal length $F = 76.6$

The measurements in the foregoing examples relative to the system including lenses $L_1$ to $L_4$, except the wave length and indices of refraction, are stated in millimeters.

Whereas in FIG. 2 the phase mixing lense 13 possesses a certain spacing $l_1$ with respect to the radiating or lighting emitting surface 2 of the diode, in the arrangement of FIG. 3 the phase mixing lense, indicated at 35 and in the form of a plano-convex lense, is cemented directly onto the light emitting surface 2 of the diode, indicated at 31. The non-coherent light emitting diode 31 is secured to a support 32. At the rear end of this support 32 there are arranged both of the current supplies or infeed lines 33 which are electrically coupled with the oscillator 11 of FIG. 1. These current supply lines extend through the support or holder device 32 and in the form of further current supplies 34 are operatively connected with the diode 31. At the light emitting surface of the diode 31 there is cemented the phase mixing lense 35. In the embodiment of FIG. 3 there is not illustrated the aperture or diaphragm. This is to signify that a diaphragm or aperture, such as indicated by reference character 14 in the arrangement of FIG. 1 and by reference character 4 in the arrangement of FIG. 2, is not necessary in every case. FIGS. 2 and 3 illustrate that the phase mixing lense approximately possesses the same spatial dimensions as the non-coherent light emitting diode.

While there is shown and described present preferred embodiments of the invention, it is to be distinctly understood that the invention is not limited thereto but may be otherwise variously embodied and practiced within the scope of the following claims.

Accordingly, I claim:

1. In a method of measuring distances using electro-optical instrumentation which includes a non-coherent light emitting diode, oscillator means for directly amplitude modulating the light beam emitted by said non-coherent light emitting diode, said light emitting diode emitting uneven modulation phases from its surface, a transmitting objective for the light beam located forwardly of said non-coherent light emitting diode in the direction of transmission of the light beam, a reflector arranged at the remote end of the distance to be measured, a receiving objective and a receiver located at the opposite end of the distance to be measured, the improvement comprising the step of providing means for mixing said uneven modulation phases in cooperating relationship with said light emitting diode, transmitting said light emitted from said diode through said phase mixing means, said transmitter objective, said reflector and said receiving objective to said receiver, whereby said transmitting objective is fully illuminated and said transmitting objective produces an image of said mixing means at an infinite distance.

2. The method of electro-optical distance measuring as defined in claim 1, wherein said non-coherent light emitting diode has a light emitting surface, and wherein said means for mixing the modulation phases comprises a phase mixing lense which possesses approximately the same spatial dimensions as said light emitting surface of said non-coherent light emitting diode.

3. The method of electro-optical distance measuring device as defined in claim 2, wherein said phase mixing lense comprises a plano-convex lense cemented directly to said light emitting surface of said non-coherent light emitting diode.

4. The method of electro-optical distance measuring as defined in claim 1, wherein said transmitting objective comprises three lense members ($L_2, L_3, L_4$) possessing the following data:

| | | | $n$ |
|---|---|---|---|
| $L_2$ | $r_3 = -68.5$ | $d_2 = 10.0$ | 1.598 |
| | $r_4 = -47.0$ | | |
| | | $l_4 = 0.2$ | |
| $L_3$ | $r_5 = -203.0$ | $d_3 = 8.5$ | 1.598 |
| | | $l_5 = 0.2$ | |
| | $r_7 = -730.0$ | | |
| $L_4$ | | $d_4 = 8.0$ | 1.598 |
| | $r_8 = -120.0$ | | |
| $\phi_8 = 70$ | | | | focal length $F = 76.6$, wherein $n$ is the index of refraction of the respective lenses, $r$ is the respective radii of curvature of the opposite surfaces of the respective successive lenses, $d$ is the respective thicknesses of the lenses, $l$ is the respective air gaps between the lenses, and $\phi_8$ is the diameter of the outlet pupil of the last lense $L_4$, all measurements being in millimeters, with the exception of the indices of refraction $n$.

5. The method of electro-optical distance measuring as defined in claim 2, wherein said phase mixing lense comprises a lense member ($L_1$) possessing the following data:

| | | | $n$ |
|---|---|---|---|
| $L_1$ | $r_1 = +0.52$ | $d_1 = 0.31$ | 1.6804 |
| | $r_2 = -0.52$ | | |

$\phi = 0.6$, wherein $r$ is the respective radii of curvature of opposite surfaces of such lense member, $d_1$ is the thickness of such lense member, $n$ is the index of refraction, and $\phi$ is the diameter of such lense member.

6. The method of electro-optical distance measuring as defined in claim 1, wherein said non-coherent light emitting diode possesses a light emitting surface having a diameter less than 0.4 millimeters.

7. The method of electro-optical distance measuring as defined in claim 1, wherein said non-coherent light emitting diode comprises a gallium-arsenide-diode having a light emitting surface capable of emitting incoherent radiation in the near infra-red region between 0.7 to 0.94 $\mu$m.

* * * * *